United States Patent [19]

Cruts et al.

[11] Patent Number: 4,780,905

[45] Date of Patent: Oct. 25, 1988

[54] COMPUTER DATA ENCRYPTION SYSTEM

[75] Inventors: Melvin L. Cruts; Michael J. Westfield, both of Milpitas, Calif.

[73] Assignee: Nightwatch, Inc., Saratoga, Calif.

[21] Appl. No.: 674,894

[22] Filed: Nov. 26, 1984

[51] Int. Cl.⁴ .............................................. H04L 9/00
[52] U.S. Cl. ......................................... 380/44; 380/28
[58] Field of Search .......................... 178/22.19, 22.09; 364/523, 200 MS File, 900 MS File; 380/23–25, 28, 44

[56] References Cited

U.S. PATENT DOCUMENTS

| 4,278,837 | 7/1981 | Best | 380/4 |
|---|---|---|---|
| 4,338,673 | 7/1982 | Brown | 364/523 |
| 4,433,207 | 2/1984 | Best | 178/22.09 |
| 4,463,421 | 7/1984 | Laws | 364/200 |
| 4,513,174 | 4/1985 | Herman | 380/23 |
| 4,520,232 | 5/1985 | Wilson | 178/22.19 |
| 4,558,176 | 12/1985 | Arnold et al. | 380/25 |

FOREIGN PATENT DOCUMENTS 0141538 11/1979 Japan ................................. 364/200

Primary Examiner—Salvatore Cangialosi
Assistant Examiner—Aaron J. Lewis
Attorney, Agent, or Firm—Flehr, Hohbach, Test, Albritton & Herbert

[57] ABSTRACT

There is disclosed a data encryption system for use in a computer system having at least one disc drive. A first memory is used for storing an encryption key and a second memory is used for storing data. Data from the second memory is logically combined with selected portions of the encryption key by a gate. Control hardware and software controls the reading and writing of data onto the disc, routing the data through the gate so that the data is automatically encrypted as it is written onto the disc and decoded as it is read from the disc. Furthermore, an encryption key portion selection circuit controls the first memory so that it outputs a sequence of selected portions of the encryption key for use by the gate as data flows through the gate. The selected portions of the encryption key correspond to the disc location where the data is stored or is to be stored.

19 Claims, 10 Drawing Sheets

COMPUTER DATA ENCRYPTION SYSTEM

The present invention relates generally to a computer data security system, and particularly to a computer disc and I/O encryption system.

The prior art includes a wide variety of data encryption devices. However, most computer data encryption systems are file oriented and reqire active user participation.

File oriented encryption systems typically encrypt only files or other predefined sets of data which are specifically designated by the user as encrypted files. Furthermore, file oriented encryption systems generally require that the user specify an encryption key or kernel value for each file. Therefore the user of the encrypted files must have access to or know the encryption key or kernel value in order to use the file. Furthermore, the user must remember (i.e., must not forget) the encryption key or kernel value because the data cannot be retrieved without it. It is in this sense that such systems require active user participation.

Such prior art systems are not sufficient for many industrial and other medium security situations because it is possible for the user to circumvent the encryption system merely by choosing not to bother using it. Since these encryption systems require extra effort on the part of the user, they are often not used as consistently as they should be. Therefore, it is possible for the users of such systems to write a file onto a floppy disc in an encrypted format, or to transmit a file over a telephone line in unencrypted format.

In most medium security situations is it strongly preferred, if not required, that all data in the system be automatically encrypted so that no unencrypted data can "inadvertently" or purposely escape the system. Clearly, in such applications it is preferred that all data be encrypted without any active participation by the users. Even better, it is preferred that the encryption process be transparent to the users of the system, except when they try to take or transmit data outside of the system.

It is also important that such a system be able to accept unencrypted data and software, preferably without any special action having to be taken by the user of the system.

In a preferred embodiment of the invention, normal users of the system can neither write unencrypted data to a disc nor transmit encrypted data over a telephone line. Only certain privileged users, such as security officers, will be able to write or transfer unencrypted data.

It is therefore a primary object of the present invention to provide an improved computer data security system.

Another object of the present invention is to provide a computer data security system in accordance with the goals discussed above.

Yet another object of the present invention is to provide an improved computer data transmission system for transmitting data with a greater data width than the data bus in the computer system.

In summary, the present invention is a data encryption system for use in a computer system having at least one disc drive. A first memory is used for storing an encryption key and a second memory is used for storing data. Data from the second memory is logically combined with selected portions of the encryption key by a gate. Control hardware and software controls the reading and writing of data onto the disc, routing the data through the gate so that the data is automatically encrypted as it is written onto the disc and decoded as it is read from the disc. Furthermore, an encryption key portion selection circuit controls the first memory so that it outputs a sequence of selected portion of the encryption key for use by the gate as data flows through the gate. The selected portions of the encryption key correspond to the disc location where the data is stored or is to be stored.

Alternately stated, the present invention is an improved computer data security system which requires no active participation by the user of the computer system. All data written onto floppy discs and/or transmitted by the computer system will automatically by encrypted.

When encrypted data is read from a floppy disc or is received by the computer system through an I/O port, the system automatically decodes the data. Furthermore, the system uses a predefined algorithm to compute the kernel to be used for encoding and decoding the data, and therefore the user does not know and does not have to remember the encryption key.

Therefore the encryption system is substantially transparent to the user under normal operating circumstances. At worst it may degrade the speed at which data is read from and written to a disc by 25%. Yet no unencrypted data can escape the system because all data on floppy discs and all data transmitted by the system is encrypted.

In another aspect of the present invention, there is provided a mechanism for use only by authorized personnel which allows unencrypted data to be written onto a floppy disc or to be transmitted. Such a mechanism is generally needed so that data can be transferred to other computer systems when such transfers are authorized.

In a preferred embodiment of the present invention, computer programs are generally stored on discs which are not encrypted. Furthermore, the present invention has a mechanism for looking at the directory on each disc and determining whether the disc contains encrypted or unencrypted data and/or programs.

Furthermore, in the preferred embodiment the kernel used as an offset into the encryption key is determined by a formula based on the disc address of the data. Data transmitted by the system uses an encryption kernel which can be based either on the date of transmission, or the hour of transmission, or on a kernel value transmitted along with the encrypted data.

In yet another aspect of the invention, there is provided a data transmission system for transmitting data having a greater data width than the computer system's data bus. In the preferred embodiment, this transmission system is used for sending a parameter called the encryption kernel from the computer's microprocessor to the encryption system.

Additional objects and features of the invention will be more readily apparent from the following detailed description and appended claims when taken in conjunction with the drawings, in which:

Figure 1:
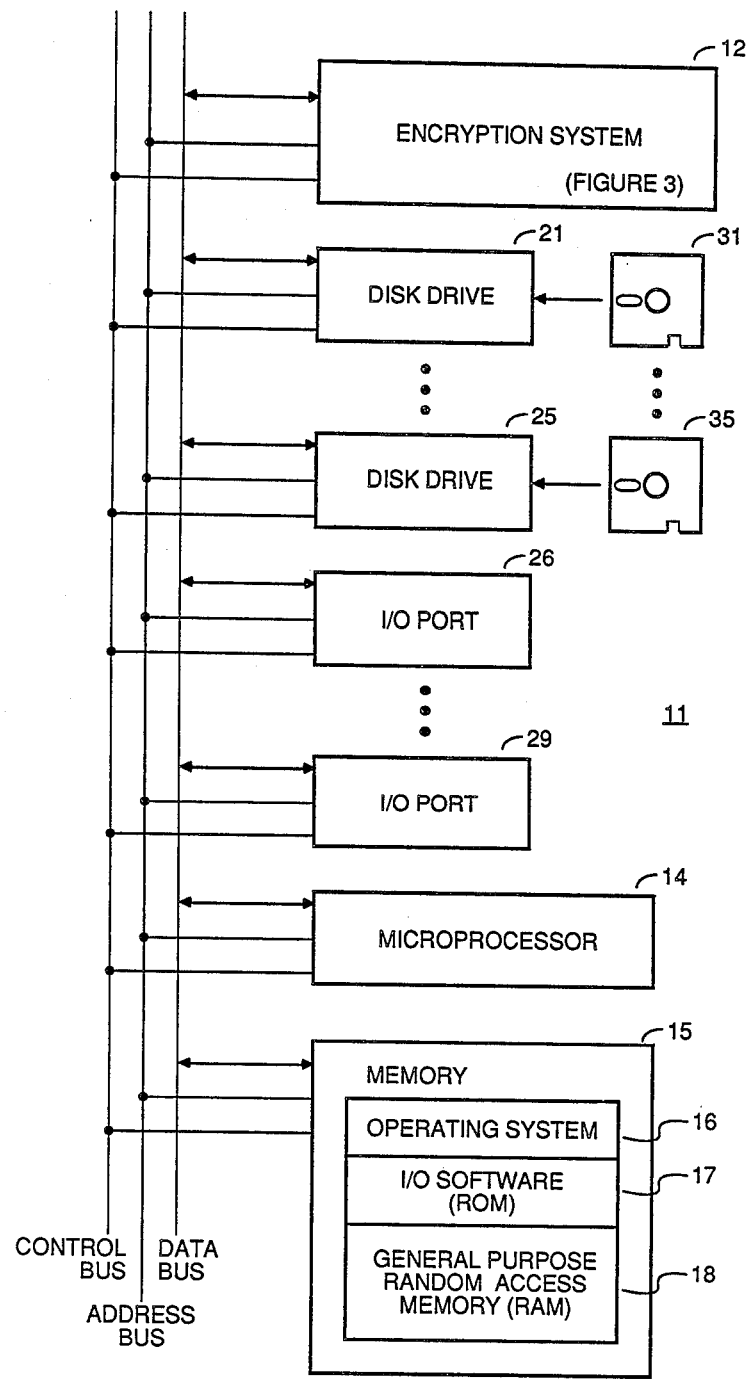
FIG. 1 depicts a block diagram of a computer system incorporating the present invention.

Referring to FIG. 1, the preferred embodiment of the present invention is shown in the context of a general purpose data processing system 11, generally called a computer. The preferred embodiment is designed for use with an IBM personal computer. It is housed on a printed circuit board which must be plugged into one of several sockets provided in the IBM computer for adding circuitry to the computer system.

The relevant features of the computer system 11 include the encryption system 12, one or more disc drives 21-25, one or more I/O ports 26-29, a microprocessor 14, and memory 15. The memory 15 includes the operating system 16, I/O software routines 17, and general purpose random-access memory (RAM) 18. As indicated in FIG. 1, the I/O software routines 17 are stored, at least in most systems, in read-only memory (ROM).

As is well known, the operating system 16 and the I/O software routines 17 are a set of computer programs used to provide a working environment for persons using the data processing system 11. Furthermore, the I/O software routines 17 are special computer program which can be used to control the flow of information into and out of the data processing system. For instance, the I/O software routines 17 generally include a disc access routine, a keyboard interpretation routine, and one or more general I/O port control routines.

Either floppy or hard discs 31-35, which are used to store data, are used in conjunction with the disc drives 21-25, depending on the type of disc drives being used.

In the preferred embodiment, it will be assumed that there is at least one floppy disc drive 21. The treatment of the data read from and written to the floppy disc 31 will be used as an example of the general operation of the invention.

For the purposes of the present invention, floppy discs are equivalent to any portable non-volatile memory media on which data can be written. Examples include magnetic tapes, portable hard discs, and non-volatile memory cartridges (regardless of the type of memory media used therein). The security problem represented by all portable memory media is the same: unless the data written onto such media are automatically encrypted, someone using the system can breach the security of the system by writing unencrypted data on the portable media and walking off with it.

Thus the term "disc drive" is used herein to mean a device for reading and writing data on a portable non-volatile memory media and the term "floppy disc" is used mean a portable non-volatile memory which is used in conjunction with the "disc drive."

An I/O port is defined to be an interface between the computer system and the rest of the world. The interface is used for either transmitting or receiving data or both. Thus, in the most general sense of the term, a disc drive is an I/O port. Also, an I/O port can be used to transmit data to and/or receive data from various pieces of apparatus which are generally viewed as being within a data processing system, but which are treated as though they are outside the system for various reasons—such as the lack of any other convenient mechanism for performing a transfer of information between these pieces of apparatus.

In the present invention, a portion of the control logic in the encryption system 12 used to receive a data value called the encryption kernel is treated as an I/O port. As will be explained below, the width of the data path through the I/O port may differ from the width of the normal data bus used in the computer system.

Figure 2:
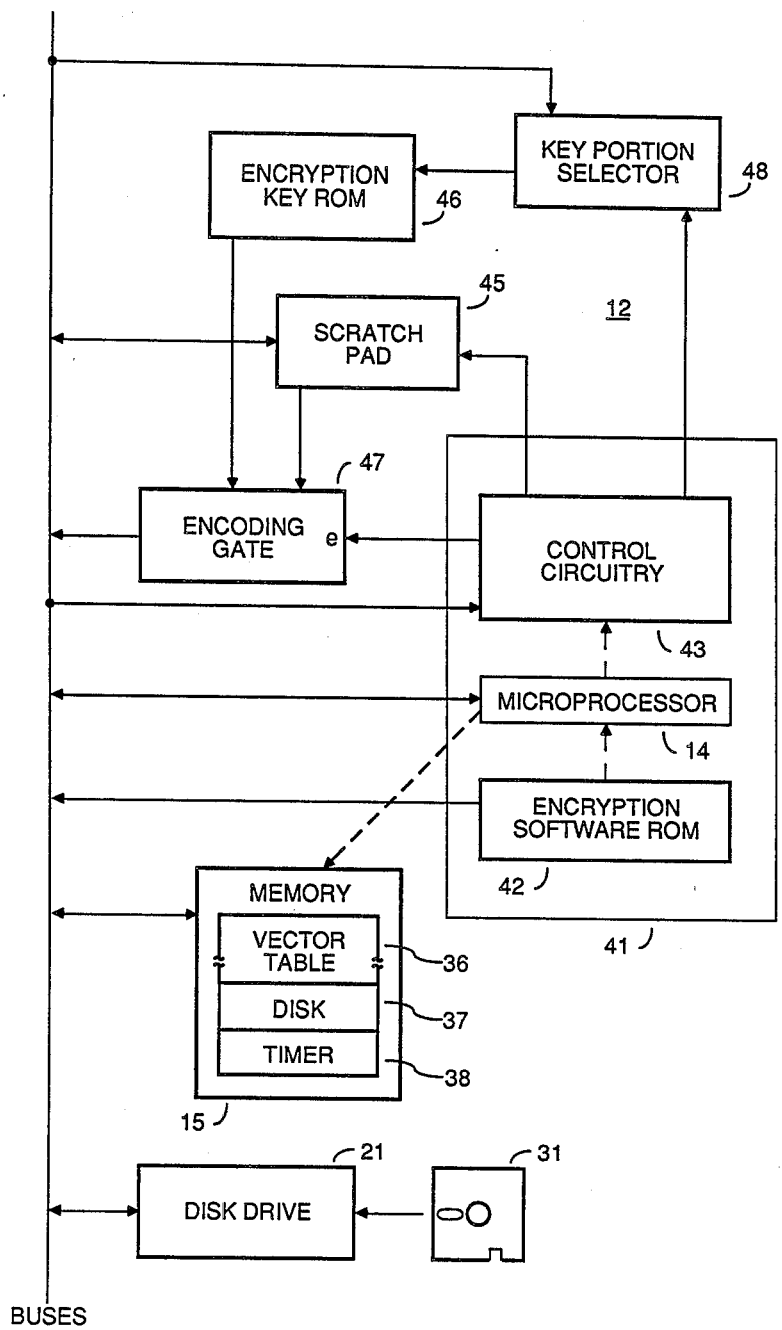
FIG. 2 depicts a functional block diagram of the present invention.

Referring to FIG. 2, dashed lines show functional relationships which would otherwise be obscure because many of the control signals used in the system are conveyed over the system buses. At a functional level, the present invention is organized as follows. When data is to be transferred either from memory 15 to a disc 31, or vice versa, control unit 41 controls the process by which the data is transferred from location to the other. As will be shown, the control unit 41 is designed so that the encryption system automatically encrypts data as it is written to disc 31 and automatically decodes data as it is read from disc 31.

The control unit 41 includes three major components: the system's microprocessor 14, encryption software 42 and control circuitry 43. The encryption software 42, which is generally stored in a read-only memory (ROM), is used by the microprocessor 14 to control the steps of the process. The control circuitry 43 controls the flow of information within the encryption system 12.

The encryption system 12 has four major components: a Scratch Pad memory 45, an encryption key 46, an encoding gate 47 and a circuit 48, called the Key Portion Selector. The Key Portion Selector 48 determines which portion of the encryption key 46 is used to encrypt or decode the data being written or read, respectively.

The encryption key 46 is generally a pattern of binary digits. Often the encryption key pattern is randomly generated, but the method by which it is derived is not important for purposes of the invention, with one exception as noted below.

In the preferred embodiment, the encryption key 46 is 64k (i.e., 65,536) bits long and is stored in an 8K×8 read-only memory (ROM). Thus any byte (i.e., eight bits) of the encryption key can be selected by presenting the corresponding address on the encryption key ROM's address lines.

In the preferred embodiment, the encryption key ROM 46 is addressed by a selector circuit 48 which increments the ROM address each time a byte of data passes through the encoding gate 47. Furthermore, the Key Portion Selector 48 receives an initial ROM address value which is computed by the control unit 41 each time an I/O operation is initiated. When data is either read from or written to a disc 31, this initial ROM address value corresponds to the location on the disc 31 where the data is being read from or written to.

The data to be encrypted or decoded is generally first copied into the scratch pad memory 46. Then it is logically combined, one byte at a time, with selected bytes of the encryption key by the encoding gate 47. The resulting data is the encrypted or decoded counterpart to the data in the scratch pad 45.

As will discussed below, a vector table 36 is stored in the memory 15 for telling the microprocessor 14 which software routines to use to handle the transmission and receipt of data via the disc drives 21-25 and ports 26-29.

Figure 3:
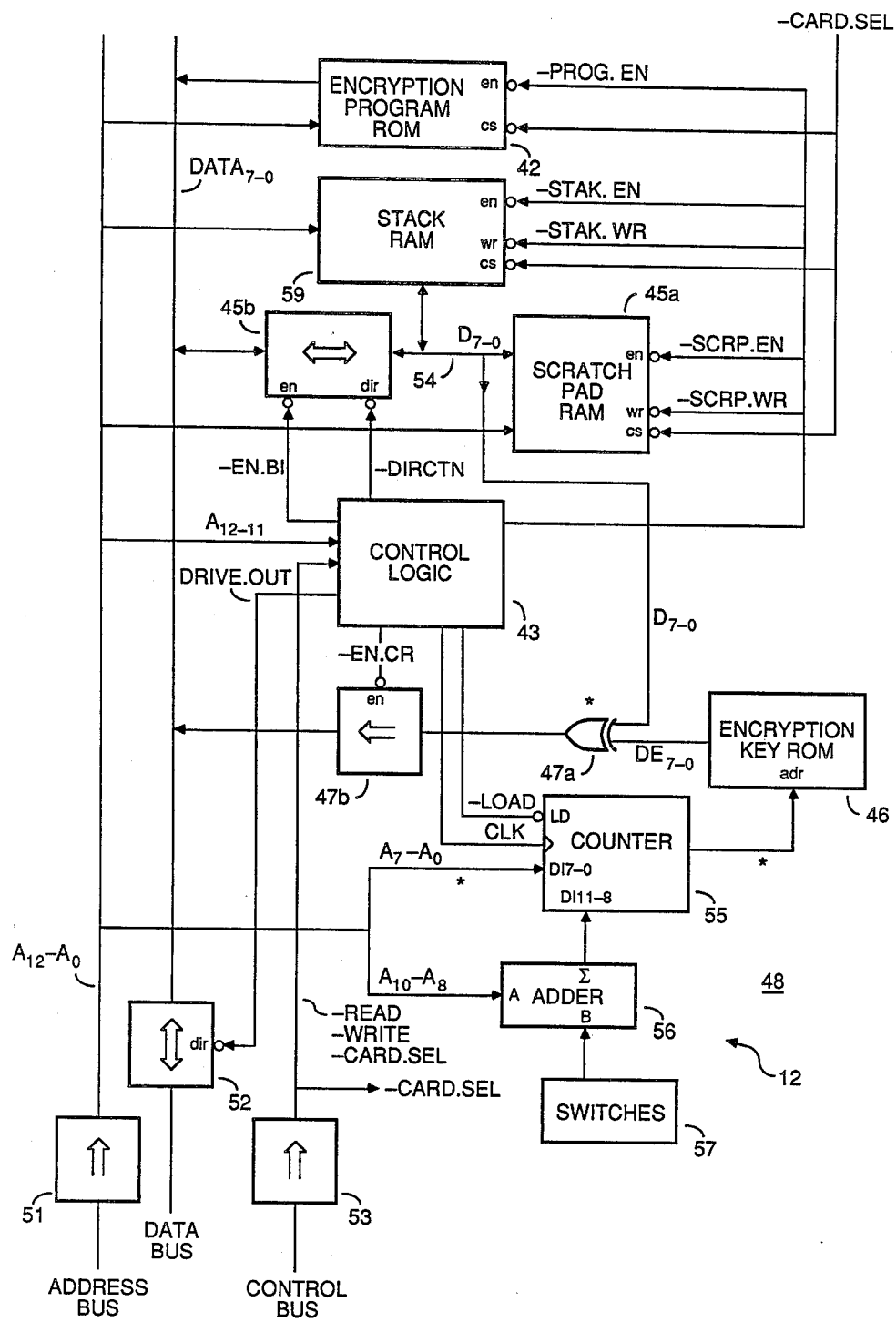
FIG. 3 depicts a schematic diagram of the preferred embodiment of the encryption hardware used in the present invention.

Referring to FIG. 3, the preferred embodiment of the encryption system 12 is shown. The encryption system 12 includes buffers 51, 52 and 53 which buffer all the signals received from and sent to the address bus, data bus and control bus, respectively. The direction in which data flows through the data bus buffer 52 is determined by a signal called DRIVE.OUT.

Signals are labeled in the drawings with names in capital levels. Standard TTL voltage level indications and naming conventions are used. Signal names preceded by a "-" are signals which are active when they are low; signal names which are not preceded by a "-" are active when they are at a high voltage (e.g., 5 volts).

The address line signals used in the encryption system are labeled A12 to A0; the data line signals are labeled DATA 7 to DATA 0; and the control line signals used in the encryption system 12 are labeled -READ, -WRITE, and -CARD.SEL.

The encryption system 12 is inactive unless the -CARD.SEL control signal is active. In particular, the memories in the encryption system are "selected" or activated by the -CARD.SEL signal.

The encryption software used by the microprocessor 14 to control the encryption process is stored in ROM 42.

The Scratch Pad 45 which is used to temporarily store the data to be encrypted or decoded includes a random access memory 45a and a bidirectional buffer 45b. The data signals on bus 54 are labelled D7 to D0 to distinguish them from the data signals on the data bus.

The operation of the buffer 45b is controlled by control circuit 43. The buffer is enabled when -EN.BI is active. Data flows from the data bus to the Scratch Pad RAM 45a only when both -EN.BI -DIRCTN is active; it flows from the Scratch Pad RAM 45a to the data bus only when -EN.BI is active and -DIRCTN is inactive.

The encoding gate 47 includes eight parallel exclusive-OR (XOR) gates 47a and a buffer 47b. Data flows through the XOR gates 47a to the data bus only when buffer 47b is enabled by an active -EN.CR signal. The output of the Encryption Key ROM 46, labelled DE7 to DE0, goes to the XOR gates 47a. In other words, each data bit Dx is exclusive-ORed with the corresponding encryption bit DEx by a separation XOR gate.

The Key Portion Selector circuit 48 comprises a counter 55, an adder 56, and a set of switches 57. The counter 57 is incremented each time a byte a data flows through the encryption gate 47 to the data bus. The adder 56 adds a 4-bit binary value selected by switches 57 to the signal on the A10 to A8 address line. The sum is loaded into the counter 56 as part of its initial counter value when the -LOAD signal is active. The remainder of the initial counter value is obtained from the A7 to A0 address lines.

Switches 57 may be a set of standard DIP switches which the user can set in accordance with any scheme he pleases. Alternately, switches 57 may be replaced with a unique hard wired pattern of connections. Systems which are allowed to share data would have identical Encryption Keys and identical switch settings. Systems which are not allowed to share data could have identical Encryption Keys with different switch settings.

The portions of FIG. 3 marked with an asterisk (i.e., "*") indicate portions of the circuit where the encryption scheme can be further complicated by rotating or otherwise interchanging the order of the signal lines which are carrying data. For instance, the twelve output signals from the counter C11 to C0 could be connected to the address port of the encryption key ROM 46 as follows:

| C0 | C2 | C4 | C7 | C9 | C11 | C10 | C8 | C6 | C3 | C1 | C5 |
|---|---|---|---|---|---|---|---|---|---|---|---|
| addr: 11 | 10 | 9 | 8 | 7 | 6 | 5 | 4 | 3 | 2 | 1 | 0 |

The effect of such an interchange is to make possession of a copy of the encryption ROM insufficient to decode encrypted data because being able to reproduce the order in which portions of the encryption key are used is essential to the decoding process.

One use of the above noted interchange feature of the invention would be to give each set of systems which are allowed to share data a unique interchange pattern. This would prevent systems from different set from exchanging data even if they are given identical encryption keys because the order in which portions of the encryption key are addressed would differ in the different systems.

A Stack memory 59 is included in the encryption system 12. This random-access memory (RAM) is used as the stack area by the microprocessor 14 when running the encryption software to ensure that the encryption software does not cause the system to overflow the allocated stack area. While the encryption software typically adds to the order of only 20 bytes to the stack, is the user of the system has not allocated enough space for these 20 bytes the use of this encyption system would not be transparent to the user. Therefore a Stack memory 59 is included to ensure that the encryption system 12 interferes as little as possible with the normal operation of the data processing system 11.

As will be shown below, while the Stack 59 is normally used for storing unencrypted data, the contents of the Stack 59 can be routed through the encoding gate 47 and thereby encrypted or decoded.

Figure 4:
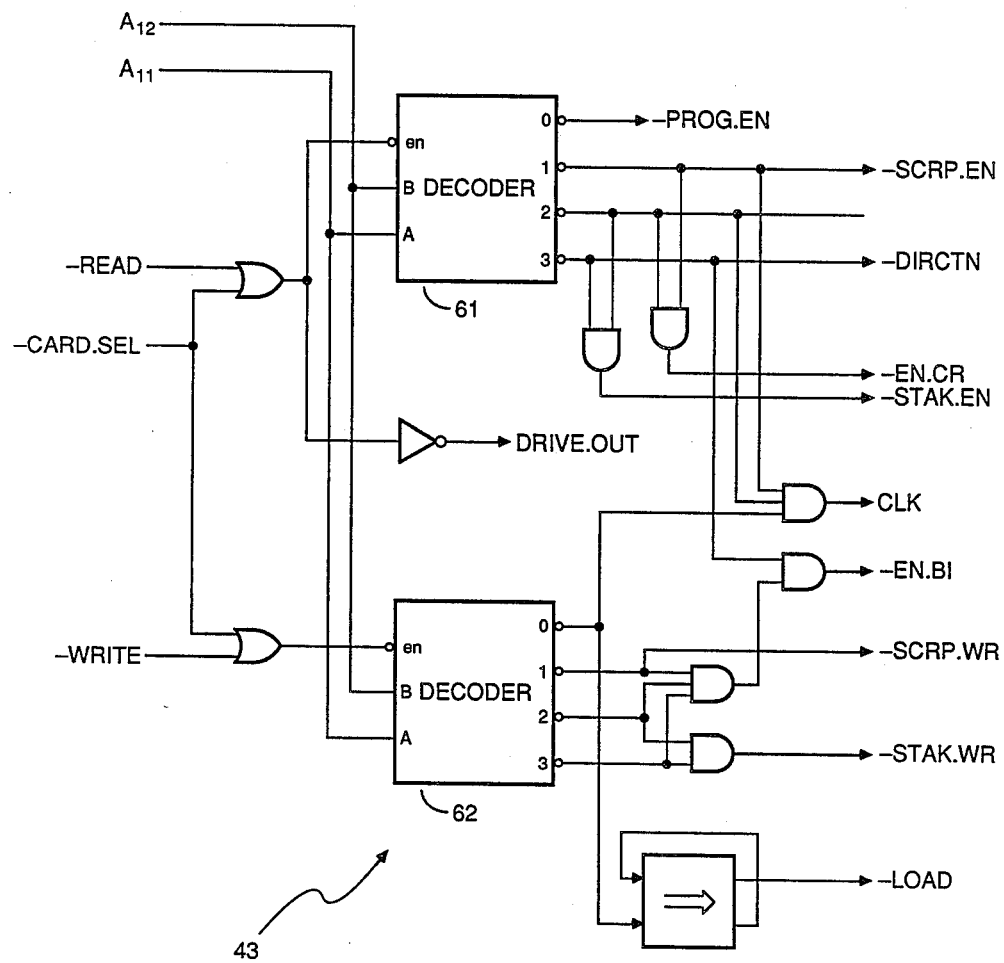
FIG. 4 depicts a circuit diagram of the control logic used in the preferred embodiment of the present invention.

Referring to FIG. 4, the preferred embodiment of the logic circuit 43 is shown. Refer to TABLE 1 for a truth table corresponding to this circuit. As can be seen from either the circuit diagram or the TABLE, the -READ and -WRITE signals determine which decoder 61 or 62 is enabled and thus whether the apparatus is in a read cycle or a write cycle. The A12 and A11 lines are use to select the particular function to be performed by the encryption system 12.

The encryption program is read from ROM 42 for use by the microprocessor 14 when the ROM 42 is enabled by the -PROG.EN signal, which happens only during a read cycle (i.e., when -READ is active) when A12,A11=0,0.

Access to the Scratch Pad 45 works as follows. Data is written into the Scratch Pad 45 during a write cycle (i.e., when -WRITE is active) when A12,A11=0,1 (i.e., when -SCRP.EN is active). Data is read from the Scratch Pad 45 during a ready cycle when A12,A11=0,1 (i.e., when -SCRP.EN is active).

Access to the Stack 59 works as follows. Data is written into the stack 59 during a write cycle when A12,A11=1,0 or 1,1 (i.e., when -STAK.WR is active). Similarly, data is read from the Stack 59 is read during a read cycle when A12,A11=1,0 or 1,1 (i.e, when -STAK.EN is active). However, during a read cycle when A12,A11=1,0, -EN.CR is active and -DIRCTN is inactive and therefore the output of the Stack goes through the encryption gate 47 on the way to the data bus. During a read cycle when A12,A11=1,1, both -EN.BI and -DIRCTN are active and therefore the output of the Stack goes directly to the data bus without going through the encryption gate 47.

For use in normal stack operations, the Stack 59 is accessed with A12,A11=1,1 so that is data read directly from the Stack 59 to the data bus without going through the encoding gate 47. However, the Stack 59 can be used as a temporary memory for holding data to be encrypted or decoded, just like the Scratch Pad 45, by accessing the Stack 59 with A12,A11=1,0.

An initial counter value is loaded into the counter 55 during a write cycle when A12,A11=0,0. Note that since A12,A11=0,0 is used to address the encryption program ROM 42, this loading step uses the same signals which would be used to write data to the ROM 42. However, since it is impossible to write data to a ROM, the ROM's address can be used for another purpose during write cycles. Furthermore, the low order address lines can be used to convey data during such write operations since they are not needed for addressing purposes. This in turn, allows the transmittal of data over both the data bus and the address bus in a single data transfer.

The above described method of transmitting a kernel value to the key portion selector 48 is an example of writing data to an I/O port "in the shadow of a ROM", i.e., using the same address space as that of a ROM.

Figure 5:
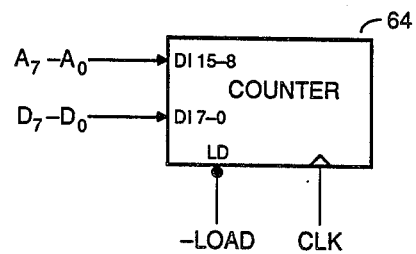
FIG. 5 depicts a schematic diagram of a variation of the preferred embodiment of the invention.

Referring to FIG. 5, there is shown an alternate method of sending an initial counter value to a counter 64. In this embodiment, part of the initial counter value is transmitted over the data bus (signals D7 to D0) and part is transmitted over the address bus (signals A7 to A0).

Figure 6:
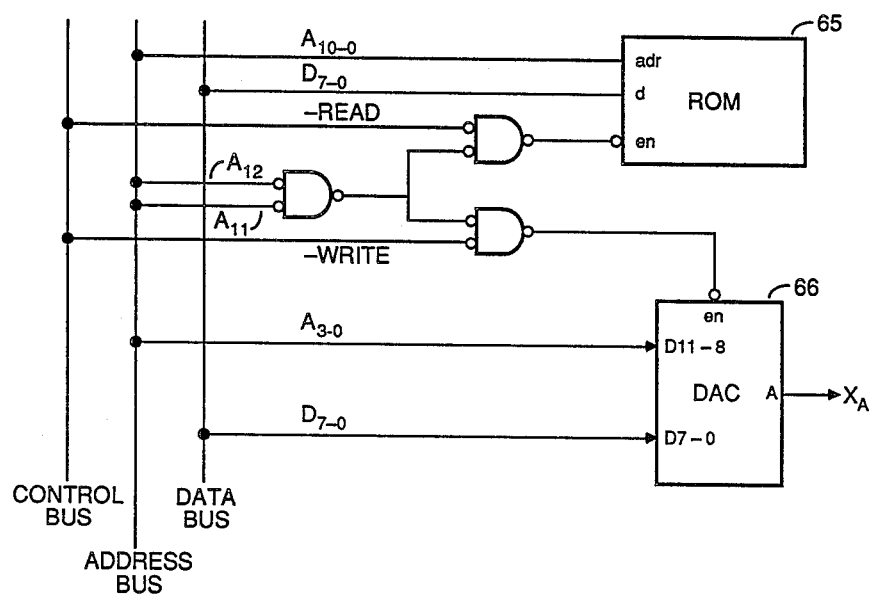
FIG. 6 depicts a schematic diagram showing an alternate use of one aspect of the present invention.

Referring to FIG. 6, there is shown another exemplary use of this aspect of the present invention. In particular, this aspect of the present invention allows a data processing system to send twelve bits of data to a twelve-bit digital to analog (DAC) converter in a single write cycle even though the system's data bus is only eight bits wide.

As in the preferred embodiment, the ROM 65 is read when A12,A11=0,0 and -READ is active. However, when A12,A11=0,0 and -WRITE is active the data on line D7 to D0 and A3 to A0 are converted by a digital to analog converter (DAC) 66 into a analog signal $X_A$. The magnitude of the analog signal $X_A$ is proportional to the value represented by the data on the DAC's input lines.

This aspect of the invention is generally applicable to any situation in which an I/O port has a data width greater than the data width of the data processing system's data bus.

Figure 7:
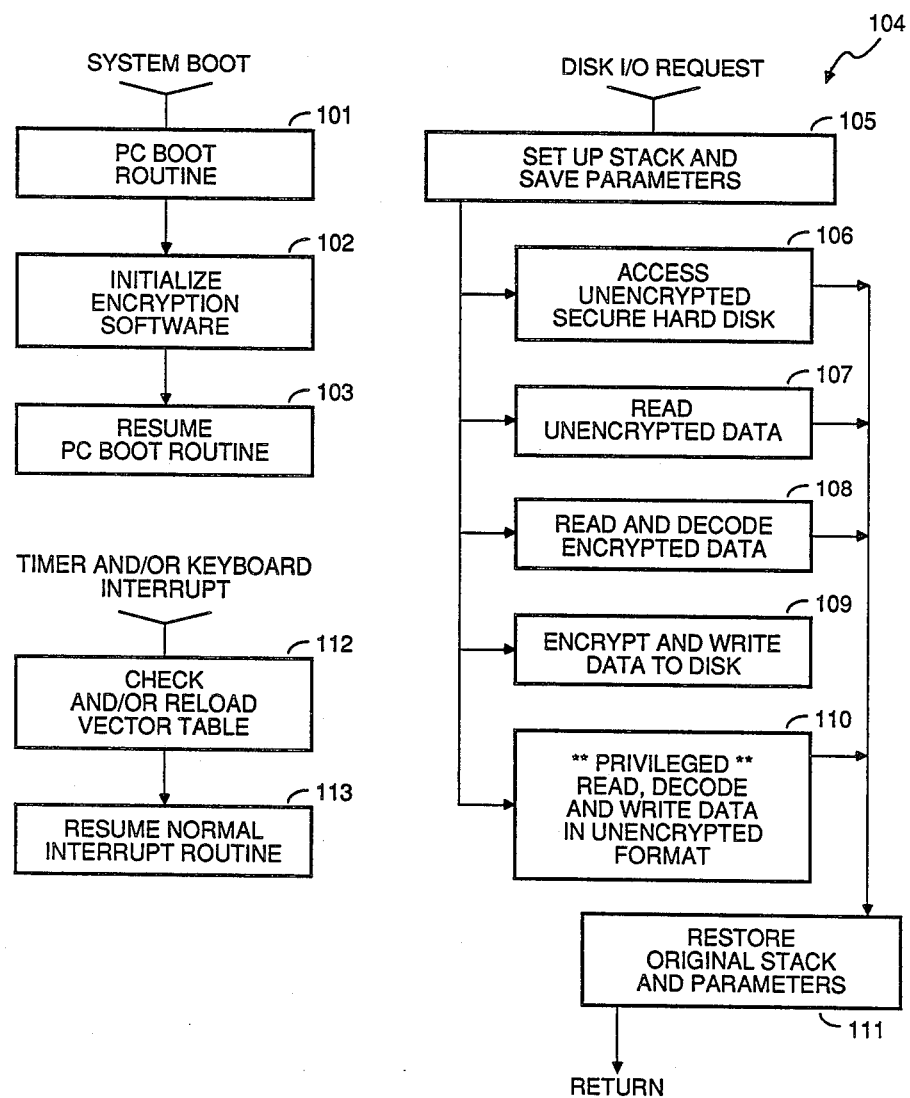
FIG. 7 depicts a block diagram of the method of the present invention.

Referring to FIG. 7, the method of the present invention involves an initialization process 102, which is performed whenever the system is booted, and a I/O request handling process 104.

The initialization process 102 is performed after the normal boot routine has been at least partially performed (box 101). After the initialization process the system's normal boot process resumes (see box 103).

The I/O request handling process 104 is used whenever the system tries to read data from or write data to a disc. The first step method of the preferred embodiment is to set the system's stack pointer to point to the Stack Ram 59 in the encryption system and to save the system's registers in the stack (which would normally be done by any I/O handling routine). Then one of five subprocesses 106-110 is performed, depending on the type of disc access which has been requested. The last step (box 111) is to restore the systems original stack pointer and register parameters.

The five I/O subprocesses are: accessing a secure disc, typically an internal hard disc, when has been designated as a disc on which unencrypted can be stored (box 106); reading unencrypted data from a disc (box 107); reading and decoding encrypted data from a disc (box 108); encrypting and writing to a disc (box 109); and a privileged writing process for use only by authorized security personnel which writes unencrypted data on a disc (box 110).

In another aspect of the preferred method, upon the occurrence of a timer interrupt and/or a keyboard interrupt, the system's pointers (called vector table entries) to the encryption software are checked and/or reloaded (box 112) before the normal timer and/or keyboard interrupt routine is performed (box 113). As will be explained below, this aspect of the invention helps prevent replacement of these pointers with pointers to software which would allow the transmission of unencryted data.

Figure 8:
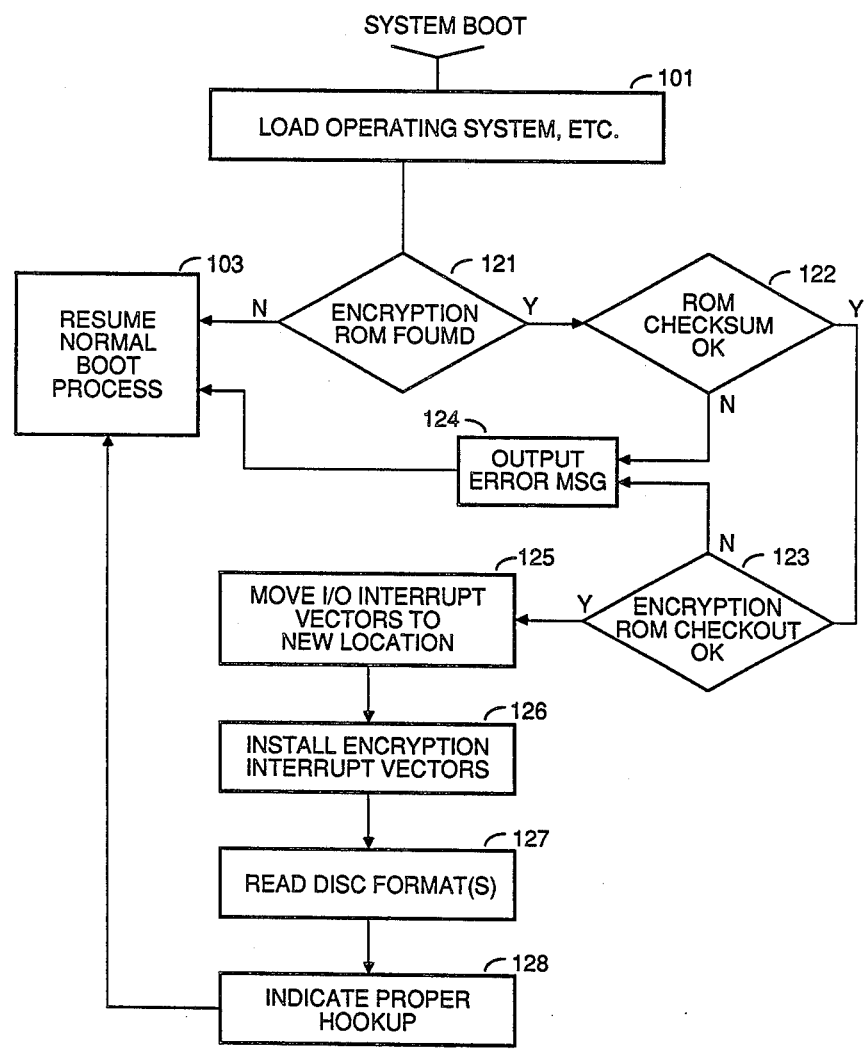
FIG. 8 is a flow chart of the initialization step of the method of the present invention.

Referring to FIG. 8, a data processing system is said to be booted whenever its power is turned on and whenever the user of the system restarts the system. Most data processing systems go through a standard set of procedures whenever the system is booted. The main purpose of the boot process is to automatically load the system's operating system into memory and to put the computer system into a known state.

In addition, during the boot process many data processing systems automatically check to see if any add-on systems are attached to the system. See box 121. This process of checking for add-on systems can be done in a number of ways, but the exact details are not important to the present invention as long as the system provides some method for an initialization program in an add-on system to be performed during or at the conclusion of the boot process. A typical boot process is as follows.

First, the presence of an add-on system is generally detected by having the system check to see if any devices respond to certain preselected signal sequences on the system's address and control busses. Second, upon finding an add-on system the data process system performs a check-sum process on the address space occupied by the add-on system. See box 122. This determines if the add-on system contains a program, typically in a read-only memory. Third, if a program was found in the add-on system and it has a proper check-sum (see box 123), the program is executed. If a program was found in the add-on system but it has an improper check-sum, then an error message is normally generated (box 124). Fourth, the system's boot process resumes its other tasks (see box 103), such as looking for other add-on systems, executing any programs which are normally executed upon booting the system, and eventually turning over control of the system to the user.

As described above with reference to FIGS. 2 and 3, in the preferred embodiment of the present invention the encryption system contains a encryption program ROM 42 which includes an initialization routine to be performed during the boot process.

Before explaining the initialization process, the following background information, which is well known to those skilled in the art, is provided. In most data processing systems, I/O requests are handled by standard routines provided by either the manufacturer of the system of by the company which provides the system's operating system. These standard I/O routines allow the system's users to write program without having to understand how the system's hardware works, except on a very superficial level. Furthermore, these standard I/O routines are often stored in a ROM so that they cannot be accidentally erased and so that each such routine begins at fixed predetermined address in the ROM.

The address of each standard I/O routine is generally stored by the system's operating system in a table 36 (see FIG. 2) called a vector table or an I/O interrupt vector table. For any given operating system, this vector table is stored at predetermined portion of the system's general purpose memory 18. Thus the address of the disc I/O routine will be stored in a particular entry 37 in the vector table 18 and every time a disc I/O request is made the routine pointed to by that particular vector table entry will be executed. For instance, in IBM Personal Computers, the address of the disc I/O routine is stored in the 13H (i.e., the 19th) entry of the vector table. In summary, whenever any standard I/O task is to be performed, the task is normally performed just by calling the routine designated by the entry in the vector table corresponding to the I/O task to be performed.

Still referring to FIG. 8, the steps of the initialization process in the preferred embodiment are as follows. First the I/O interrupt vectors for all the types of I/O handling requests which will require data encrypting and decoding are moved from their normal position in the system's I/O vector table to a new location in the system's memory. See box 125. It should be noted that most data processing systems, including the IBM Personal Computer, allocate a significant amount of space in the vector table for the storage of vectors in addition to those provided for accessing the standard I/O routines. In the preferred embodiment, the I/O vectors which are moved into this supplemental portion of the vector table.

Next, the initialization process replaces the original vector entries for each of these I/O tasks with vectors which point to routines in the encryption program ROM 42. See box 126.

Then, the format of a discs attached to the system are read for reasons which are explained below. See box 127.

Lastly, a message is generated to indicate paper hook up of the encryption system (box 128) and control is returned to the boot program so that the normal boot process of the system can resume (box 103).

Referring back to FIG. 6, in another aspect of the preferred method, upon the occurrence of a timer interrupt and/or a keyboard interrupt, the system's vector table entries for the encryption software are checked and/or reloaded (box 112) before the normal timer and/or keyboard interrupt routine is performed (box 113). This could be easily implemented with one or more block move instructions which duplicate the function of boxes 126 and 127 in FIG. 8. The timer and keyboard interrupts are especially appropriate for this purpose because they are used frequently and could therefore defeat most attempts to replace the pointers to the encryption software with pointers to software which would allow the transmission of unencrypted data. This aspect of the invention is accomplished by replacing the normal vector table entries 38 (see FIG. 2) for timer and/or keyboard interrupts with pointers to software in the encryption software ROM 42 corresponding to boxes 112-113.

Figure 9:
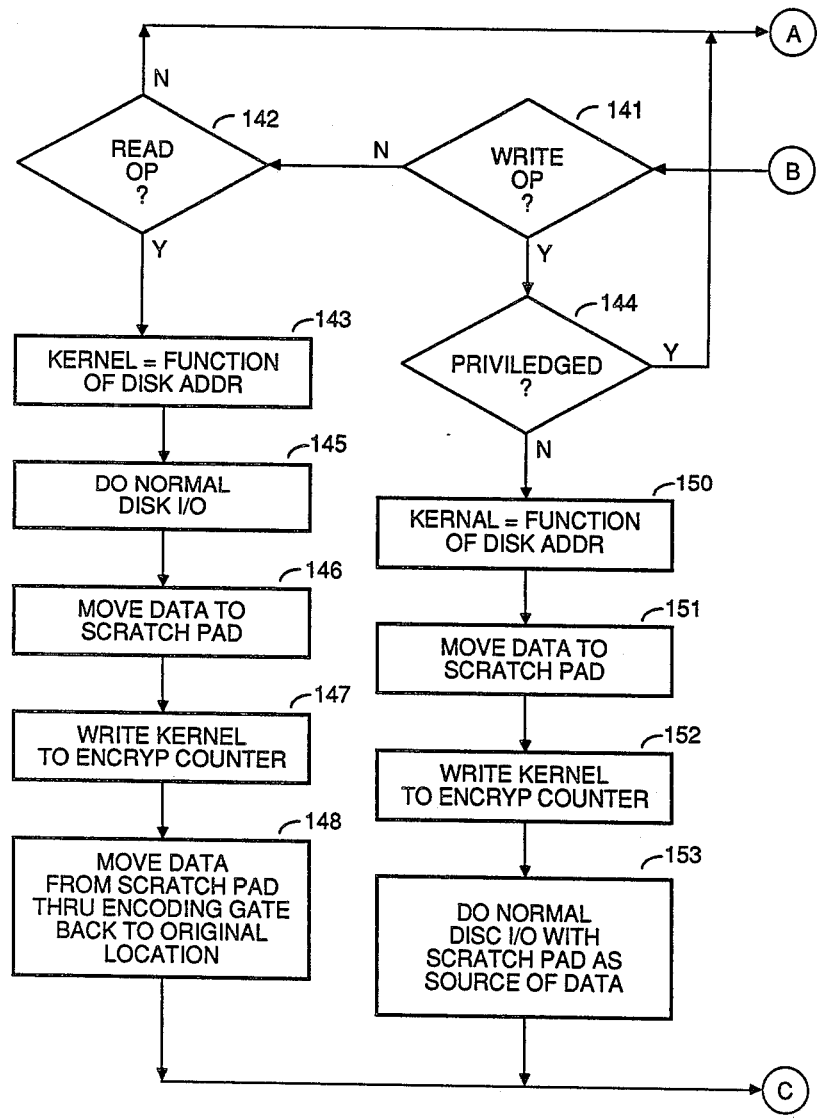
FIG. 9 is a flow chart of a preferred encryption/decoding method for disc I/O.
Figure 9A:
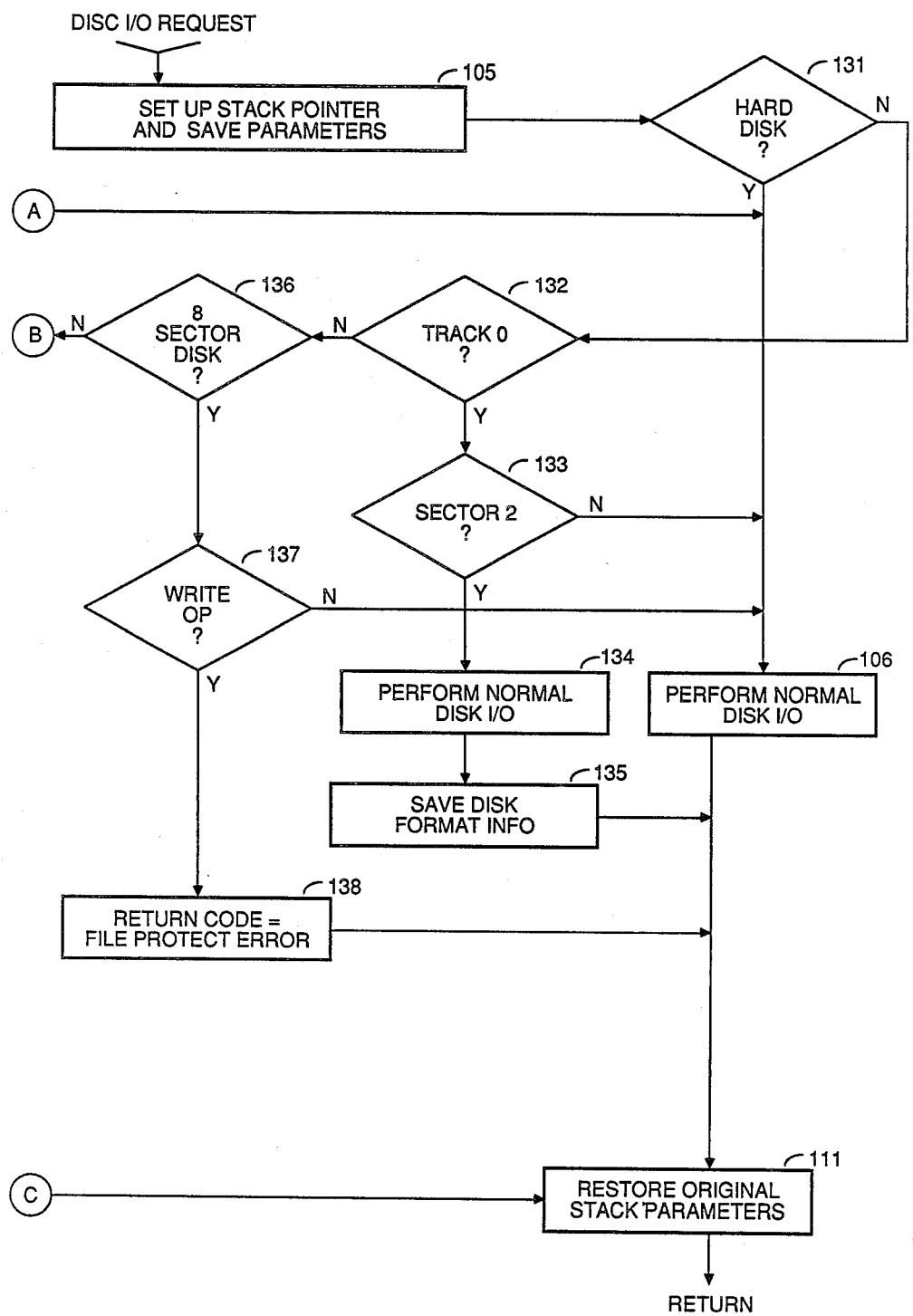

Referring to FIG. 9, before explaining the disc I/O process or the preferred embodiment, the following background information, which is well known to those skilled in the art, is provided. First, in many medium security situations, it may be unnecessary to encrypt the data stored on a hard disc which is internal to the computer because there are already security measured in place which prevent anyone from walking off with the computer.

Second, computer programs which are sold or licensed commercially are generally written on 8-sector floppy discs while other floppy discs are usually formatted as 9-sector discs. Therefore the "data" on 8-sector discs is generally computer programs, which are not encrypted, and therefore should be read as unencrypted data.

Third, track 0 on floppy discs is used to store the disc's format information and the beginning of its file allocation table. Track 0 zero is not used to store data and therefore need not be encrypted. Also, from the information in sector 2 of track 0 one can determine what the format of the disc. Furthermore, there are certain bits on track 0 which are not used for any predetermined purpose in most systems, and these bits can be used to tag the disk as having encrypted data.

Fourth, it is a goal of the preferred embodiment to make the presence of the encryption system as transparent as possible to the user of the system. Therefore it is important that encrypted data never be legt in the user's buffers or anywhere else that the user might have access to.

Fifth, since the vectors for the standard I/O routines were merely moved to a new location by the initialization process, these routines are still available for use as subprocesses by the encryption process.

Sixth, in most computer systems blocks of data can be moved from one memory location to another by a single block move instruction. This is generally the fastest way to move data. Also, it should be noted that the data is being read from the Scratch Pad 45, using an address with A12,A11=0,1 the data will automatically move through the encoding gate 47 as it is being read. Also the counter 55 will automatically increment each time a byte of data is read due to the toggling of the signals on the system's address and control busses.

Still referring to FIG. 9, the encryption process of the preferred embodiment works as follows. The first step method of the preferred embodiment is to set the system's stack pointer to point to the Stack Ram 59 in the encryption system and to save the system's registers in the stack. See box 105. The last step of the process will be to restore the stack pointer and system parameters. See box 111.

If the I/O request is to a secure hard disc (box 131), the standard disc I/O routine is called (box 106).

Otherwise, the process checks to see if track 0 of the disc being accessed is the track being addressed (box 132). If so, the process checks to see if sector 2 is being addressed (box 133). In either case, the next step is to call the standard disc I/O routine (box 134 and 106). But if sector 2 is being addressed, after the standard I/O routine is finished certain information from the disc format is saved by the process (box 135) so that it will know whether the disc has an 8-sector or 9-sector format.

If track 0 is not being addressed, the process next checks to see if the disc being addressed has an 8-sector format (box 136). If so, the process assumes that the disc is a program disc and also assumes that no data is to be written to the disc. If there is an attempt to write data onto an 8-sector disc (box 137) an error code corresponding to a file protect error (i.e., an attempt to write on a write-protected disc) is generated (box 138) and no data is written onto the disc. Read requests addressing 8-sector discs are handled by calling the standard disc I/O routine (box 106).

If a 9-sector disc is being accessed and track 0 is not being addressed, read and non-privileged write requests are handled as follows. First the process checks to see if the request is a write request (box 141) or a read request (box 142) or neither (in which case the standard disc I/O routine is called to handled the error). In either case, the next step of the process is to compute the value of the encryption kernel which is to be loaded into the counter 55 in the encryption apparatus (box 143 and 150). The value of the kernel is a preselected function of the disc address which is addressed by the disc I/O request, such as:

kernel=ROTATE ((track*$a$+sector*$b$+$c$), 4)

where TRACK and SECTOR are the numeric address of the track and sector being accessed; a, b, and c are preselected constants; and the ROTATE (X,4) function rotates the binary value of X by 4 bits in the rightward direction.

In the read process, the process continues by calling the normal disc I/O routine (box 145), and moving the data into the Scratch Pad 45 on the encryption board (box 146). In some embodiments the data can be read directly from the disc into the Scratch Pad 45, thereby saving the time required for moving the data from the general system memory into the Scratch Pad 45. Then the kernel is loaded into the counter 55 (box 147) and then a block move is executed so that the data in the Scratch Pad 45 is moved through the encoding gate 47 to the memory area originally designated as the destination of the disc data (box 148).

In the write process the data to be written is first moved to the Scratch Pad 45 (box 151) and the kernel is loaded into the counter 55 (box 152). Then the standard disc I/O routine is called, with the Scratch Pad designated as the source of the data. This automatically causes encrypted data to be written onto the disc because the data moves through the encoding gate 47 as it is read onto the data bus for transfer to the disc.

Still referring to FIG. 7, there are two preferred embodiments of the privilege write process (box 110). In both embodiments, the write process reverts back to the standard disc I/O routine if the privileged write process has been enabled. See box 114. In one embodiment, only the privileged user has a proprietary program which temporarily sets a flag in the Stck Ram 59, which is detected at box 144 of the write process. If the flag is set then data is written without it being encrypted. In the other embodiment, box 144 represents a process which tests to see if a particular device is attached to the system. This device is typically a ROM housed in a package which can be attached to one of the system's ports. If certain data in the ROM matches a predefined pattern, then the privileged write process is enabled.

Figure 10:
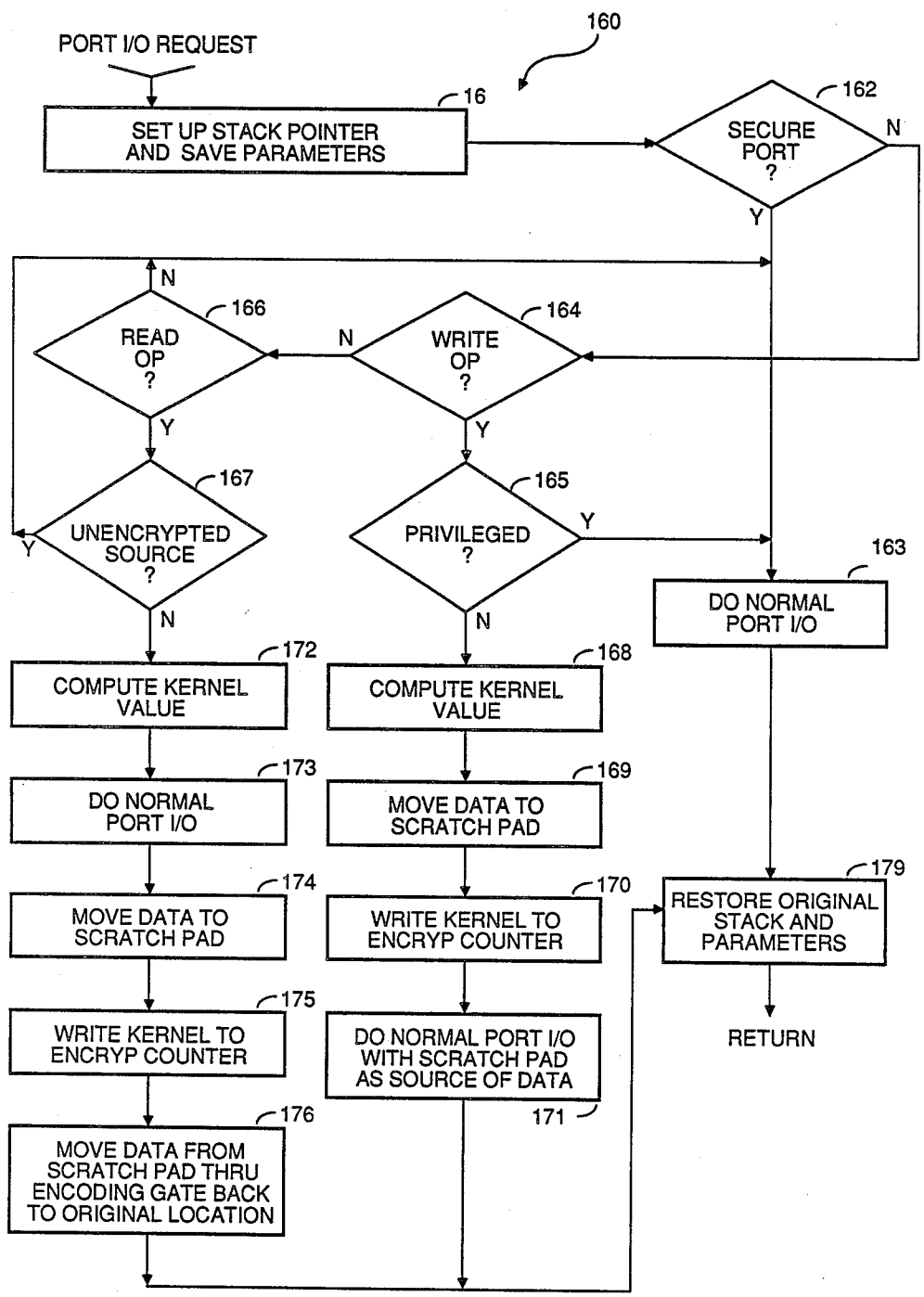
FIG. 10 is a flow chart of a preferred encryption/decoding method for I/O through ports other than a disc.

Referring to FIG. 10, a similar method 160 is used to handle the reading and writing of encrypted data to I/O ports other than the disc drives. First, the system's stack pointer is set to point to the Stack Ram 59 and the system's registers are stored in the Stack 59 (box 161). The next step is to determine if the I/O port is a secure port (box 162) to which unencrypted data can be safely sent. If so, the standard I/O routine for that port should be used (box 163). The last step of the process, regardless of which subprocess used is to restore the system's original stack pointer and register parameters (box 179).

The reading (i.e., receiving) and writing (i.e., transmitting) of encrypted data is handled almost identically as the read and write processes shown in FIG. 9. If data is being transmitted to a port (box 164), the first test is to see if a privilege write operation has been enabled. If so, the normal port I/O routine is used (box 163). If data is being received from a port (box 166) the first test is to see if the data being received is unencrypted. If so, the normal port I/O routine is used. Any number of mechanisms can be devised to either detect or indicate that data being received is unencrypted. For instance, all transmitted encrypted data could be started with a preselected initial data sequence that indicates that the data is encoded. Data received which does not have the preselected initial data sequence can be assumed to be unencrypted. Alternately, whenever encrypted data is being received the user could be required to so inform the system.

Steps 168 to 176 of the reading and writing processes are identical to steps 150 to 153, and steps 143 and 145 to 148 in FIG. 9, with the exception that the encryption kernel is a function of some other system parameter than the disc address. In the preferred embodiment, the kernel is based on the date and hour of transmission. Generally, in alternate embodiments, the kernel value is a function of the date; the time; a predefined quantity; or a quantity whose value can be derived using a predefined algorithm from the date, the time, the data being transmitted or received, a predefined quantity, or any combination thereof.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

For instance, in other embodiments the selector circuit 48 could decrement the ROM address or could change the ROM address in accordance with any other preselected algorithm. Since the pattern in the encryption key ROM 46 is already quite long and basically random in nature, a simple incrementing scheme for selecting the ROM address is usually sufficient in medium security situations. However, an extra layer of security can be provided by the use of even a fiarly simple but proprietary key portion selecting algorithm, because then both the encryption key and the key portion selecting algorithm are needed to decode encrypted data.

As will be understood by those skilled in the art, the encryption system 12 will generally have a data path which matches the data width of the system's data bus, thereby minimizing the amount of time used by the encryption or decoding process. Thus in systems with a data bus which is 16 bits wide, two bytes of data would generally be encrypted or decoded at a time.

TABLE 1

CONTROL LOGIC TRUTH TABLE

| | READ CYCLE | | | | WRITE CYCLE | | | |
|---|---|---|---|---|---|---|---|---|
| INPUT SIGNALS | | | | | | | | |
| -CARD.SEL | — | A | A | A | A | A | A | A | A |
| -READ | x | A | A | A | A | — | — | — | — |
| -WRITE | x | — | — | — | — | A | A | A | A |
| A12 | x | 0 | 0 | 1 | 1 | 0 | 0 | 1 | 1 |
| A11 | x | 0 | 1 | 0 | 1 | 0 | 1 | 0 | 1 |
| OUTPUT SIGNALS | | | | | | | | |
| DRIVE.OUT | — | A | A | A | A | — | — | — | — |
| -PROG.EN | — | A | — | — | — | — | — | — | — |
| -SCRP.EN | — | — | A | — | — | — | — | — | — |
| -STAK.EN | — | — | — | A | A | — | — | — | — |
| -SCRP.WR | — | — | — | — | — | — | A | — | — |
| -STAK.WR | — | — | — | — | — | — | — | A | A |
| -DIRCTN | — | — | — | — | A | — | — | — | — |
| -EN.BI | — | — | — | — | A | — | A | A | A |
| -EN.CR | — | — | A | A | — | — | — | — | — |
| CLK | — | — | A | A | — | A | — | — | — |
| -LOAD | — | — | — | — | — | A | — | — | — |

What is claimed is:

1. In a data encryption method for use in a computer system having at least one disc drive for reading and writing data on a disc, a central processor, memory means for storing data, bus means for transmitting data between said central processor, said memory means and said disc drive, key means for storing a predefined encryption key, and gate means for logically combining data with a selected portion of said encryption key; the steps comprising:

during the reading and writing of data onto a disc, routing said data through said gate means, so that data is automatically encrypted as it is written onto said disc and automatically decoded as it is read from said disc;

selecting the portion of said encryption key to be used by said gate means as a function of the disc location where said data is stored or is to be stored; and performing a predefined process in said computer system upon the occurrence of predefined interrupt events to ensure that all data read from and written onto said disc is automatically routed through said gate means and is therefore not transmitted directly between said disc and said memory means via said bus means;

whereby, all data written by said system onto a disc is automatically encrypted, and said encryption is transparent during normal use of said system.

2. The method of claim 1, wherein said selecting step includes:

incrementing or decrementing the value of the address used to address said key means as data flows through said gate means; and defining an initial address value for addressing said key means, said initial address value corresponding to a preselected disc location.

3. The method of claim 1, further including the step of:

during the writing a data onto a disc, determining if the writing of unencrypted data has been authorized, and if so, writing said data onto said disc via said bus means without performing said step of routing said data through said gate means.

4. The method of claim 1, wherein said computer system includes an interrupt vector table having entries for defining the software routines to be used upon the occurrence of a defined set of interrupts, said defined set of interrupts including at least one interrupt for accessing the data on said disc;

said method including the additional step of:

when said computer system is booted, automatically storing in said interrupt vector table, in the entry corresponding to the interrupt for accessing the data on said disc, a predefined address value corresponding to a predefined software routine which causes the system to perform said routing and selecting steps.

5. The method of claim 4, wherein said interrupt vector table includes entries corresponding to a timer interrupt and/or a keyboard interrupt;

said method including the additional step of:

when said computer system is booted, automatically storing in said interrupt vector table, in the entries corresponding to said timer interrupt and/or keyboard interrupt, a value corresponding to a predefined software routine which causes the system, upon the occurrence of said timer interrupt and/or keyboard interrupt, to automatically ensure that said predefined address value is stored in said interrupt vector table.

6. In a computer system having at least one disc drive for reading and writing data on a disc, a central processor, memory means for storing data, and bus means for transmitting data between said central processing, said memory means and said disc drive, data encryption apparatus comprising:

key means for storing a predefined encryption key;

gate means for logically combining data with a selected portion of said encryption key;

control means for transmitting data between said memory means and a specified disc location on said disc, including software means for routing said data through said gate means, and key portion selection means for selecting the portion of said encryption key to be used by said gate means as a function of said specified disc location; and interrupt software means, responsive to the occurrence of predefined interrupt events in said computer system, for ensuring that said control means is activated so that all data written onto said disc is automatically encrypted as it is written onto said disc and decoded as it is read from said disc, and for thereby preventing data from being transmitted directly between said disc and said memory means via said bus means;

whereby, all data written by said system onto a disc is automatically encrypted, and said encryption is transparent during normal use of said system.

7. The system of claim 6, wherein said computer system includes an interrupt vector table having entries for defining the software routines to be used upon the occurrence of a defined set of interrupts, said defined set of interrupts including at least one interrupt for accessing the data on said disc; and said data encryption system includes
boot means for automatically, when said computer system is booted, storing in said interrupt vector table in the entry corresponding to the interrupt for accessing the data on said disc, a predefined address value corresponding to a predefined software routine which causes the system to route data transmitted to and from said disc through said gate means.

8. The system of claim 7, wherein
said interrupt vector table includes entries corresponding to a timer interrupt and/or a keyboard interrupt; and
said boot means includes means for automatically, when said computer system is booted, storing in said interrupt vector table, in the entries corresponding to said timer interrupt and/or keyboard interrupt, a value corresponding to a predefined software routine which causes the system, upon the occurrence of said timer interrupt and/or keyboard interrupt, to automatically ensure that said predefined address value is stored in said interrupt vector table.

9. In a computer system having at least one disc drive for reading and writing data on a disc, a central processor, memory means for storing data, and bus means for transmitting data between said central processor, said memory means and said disc drive, data encryption apparatus comprising:
key means for storing a predefined encryption key;
gate means for logically combining data with a selected portion of said encryption key; and
control means for transmitting data between said memory means and a specified disc location on said disc, including
software means for routing said data through said gate means, and
key portion selection means for selecting the portion of said encryption key to be used by said gate means as a function of said specified disc location.

10. The data processing system of claim 9, wherein
said system includes at least one disc drive for reading and writing data on a disc; a central processor; and memory means for storing data;
said address and data busses are coupled to said central processor, memory means and disc drive for transmitting data between said central processor, said memory means and said disc drive; and
said system further includes:
key means for storing a predefined encryption key;
gate means for logically combining data with a selected portion of said encryption key;
control means for transmitting data between said memory means and a specified disc location on said disc, including
software means for routing said data through said gate means, and
key portion selection means for selecting the portion of sid encryption key to be used by said gate means as a function of said specified disc location; and
interrupt software means, responsive to the occurrence of predefined interrupt events in said computer system, for ensuring that said control means is activated so that all data written onto said disc is automatically encrypted as it is written onto said disc and decoded as it is read from said disc, and for thereby preventing data from said transmitted directly between said disc and said memory means, and between said disc and said central processor, via said bus means;
whereby, all data written by said system onto a disc is automatically encrypted, and said encryption is transparent during normal use of said system.

11. The system of claim 10, wherein said key portio selection means includes:
counter means for generating an incrementing or decrementing value; and
means for defining an initial counter value for said counter means, said counter value corresponding to said specified disc location, said initial counter value having a data width greater than said data bus, said means for defining an initial counter value including one of said I/O ports having a data width greater than said data bus.

12. The system of claim 6, wherein said key portion selection means includes:
counter means for generating an incrementing or decrementing value for selecting the portion of said encryption key to be used by said gate means; and
means for defining an initial counter value for said counter means, said initial counter value corresponding to said specified disc location.

13. In the system of claim 12,
wherein said initial counter value and said specified disc location are both multibit binary values, and a plurality of the bits comprising said initial counter value are equal to preselected ones of said specified disc location.

14. The system of claim 6, wherein
said control means includes privileged access means for transmitting data between said memory means and said disc via said bus means without going through said gate means; wherein decoded data can be written onto a disc only through the use of said privileged access means.

15. The system of claim 14, wherein said privileged access means includes:
key means for limiting the use of said privileged access means to a predefined set of persons; and
means for initiating the decoding of encrypted data on a disc and for routing the resulting decoded data to a selected destination.

16. The system of claim 6, wherein said control means includes:
detection means for determining whether information on a disc is encrypted or unencrypted.

17. The system of claim 16, wherein
said detection means includes means for reading preselected portions of said disc and for using a predefined algorithm based on the information in said preselected portions of said disc to determine whether the information on said disc is encrypted or unencrypted.

18. The system of claim 6, further including:
I/O control means for controlling the transmitting of data to and receiving of data from an I/O port, including means for routing said data through said gate means, thereby encrypting said data as it is transmitted and decoding said data as it is received;

said key portion selection means including means for selecting a portion of said encrypted key, when data is being either received from or transmitted to an I/O port, having a value corresponding to a predefined quantity.

19. The system of claim 6, said predefined quantity being selected from a set consisting of: the date; the time; a predefined quantity; and a quantity whose value can be derived using a predefined algorithm from the date, the time, the data being transmitted or received, a predefined quantity, or any combination thereof.

* * * * *